United States Patent

Basfeld et al.

[15] 3,638,798

[45] Feb. 1, 1972

[54] FILTER STRUCTURE

[72] Inventors: Klaus Basfeld; Heinrich Schreiber, both of Grevenbroich, Germany

[73] Assignee: Maschinenfabrik Buckau R. Wolf Aktiengesellschaft, Grevenbroich, Germany

[22] Filed: Sept. 26, 1969

[21] Appl. No.: 863,417

[30] Foreign Application Priority Data

Sept. 18, 1968 Germany.....................P 17 86 325.1

[52] U.S. Cl............................................................210/404
[51] Int. Cl...........................................................B01d 33/06
[58] Field of Search...........................210/392, 393, 402, 404

[56] References Cited

UNITED STATES PATENTS

| 872,616 | 12/1907 | Fairchild | 210/404 X |
| 1,558,038 | 10/1925 | Mount | 210/404 X |

*Primary Examiner*—Reuben Friedman
*Assistant Examiner*—T. A. Granger
*Attorney*—Michael S. Striker

[57] ABSTRACT

A rotatable filter drum has a plurality of internal filter cells which orbit about the axis of rotation of the drum in an endless path in which they are alternately immersed into and emerge from a bath of liquid to be filtered. Suction means communicates with the cells for drawing liquid in form of the initial filtrate into the cells when the same are immersed, with concomitant buildup of a filter cake on the exterior of the drum in the area of the respective cells. Dispensing means dispenses a wash solution onto the cells when the same are emerged from the bath so that the wash solution penetrates the filter cake and enters into the cells as a wash filtrate. A leading and a trailing conduit communicate with each of the cells in the respective leading and trailing regions thereof for evacuating the initial and wash filtrate therefrom. Control valve means defines two concentric annular interior channels one of which communicates with the leading conduits and the other of which communicates with the trailing conduits. First and second outlet means communicate with both of the channels, and adjustable control means in the annular channels is operative for diverting initial filtrate into the first outlet means and wash filtrate into the second outlet means to thereby separate the initial filtrate and the wash filtrate from one another.

12 Claims, 10 Drawing Figures

INVENTOR
KLAUS BASFIELD
HEINRICH SCHREIBER

By: Michael S. Striker

INVENTOR
KLAUS BASFIELD
HEINRICH SCHREIBER

By: Michael J. Striker

FILTER STRUCTURE

BACKGROUND OF THE INVENTION

The present invention relates generally to filter structures, and more particularly to vacuum filters. Still more specifically the invention relates to continuous vacuum filters.

Continuous vacuum filters of the cell or compartmented type are already known. Basically, they consist of a cylindrical drum supported in an open-top tank or vat in such manner as to allow rotation of the drum therein around its own axis which is usually in a horizontal plane. The position of the drum in the tank is such that its lower portion is confined within the tank walls while the upper portion is exposed above them.

The drum shell is composed of a number of shallow compartments over which there is secured a covering of filter material. The interior of each compartment communicates with a valve mechanism which, during operation, automatically applies either suction or positive air pressure to the respective conduits in rotation and through them in turn to the interior of the compartments. Filter structures of this general type are disclosed in DAS 1,204,200, Gebrauchsmuster 1,988,626 and on pages 976 ff. of Chemical Engineer's handbook, Third Edition, published by McGraw-Hill Inc., to name only a few sources of background information relating to this general type of filter structure.

As the cells enter into the bath of liquid confined in the tank and which is to be filtered, the liquid is drawn into the immersed cells and at the exterior of the drum opposite these cells a filter cake forms. Subsequently, these cells emerge from the tank and then move into the range of a dispensing arrangement for wash solution which, being sprayed or otherwise brought onto the filter cake into the respective cells in form of a wash filtrate by contrast to the initial filtrate obtained by passage of the liquid to be filtered into the cells while the same were immersed in the tank.

The problem with the known constructions of the prior art is that the separation between the initial filtrate and the wash filtrate is very difficult to accomplish. The reason for this is that the cells can be completely evacuated only at a rather slow pace so that it is difficult to prevent admixture of the two filtrates as the drum orbits between cell-immersing and cell-washing positions. It is therefore necessary in such filter constructions that the filtrate path in each cell be as short as possible. In other words, a sufficient number of outlets must be associated with each cell. This requirement is made even more urgent by the fact that the position of each cell constantly changes as it moves from immersed position to emerged or washing position, and back to immersed position. In order to obtain under these circumstances a proper and relatively rapid filtrate evacuation from the respective cells, the known filter structures of this type provide each individual cell with leading and trailing filtrate conduits, that is the leading region and the trailing region of each cell as seen with reference to the direction of rotation of the drum each has associated therewith a separate conduit through which filtrate can leave the cell. Thus, depending upon the respective inclined position which the cell assumes depending upon its location at any given moment, filtrate may pass through the leading conduit, the trailing conduit or through both simultaneously. The leading conduits all extend to a stationary control valve, and similarly the trailing conduits all extend to the stationary control valve, but the leading conduits and the trailing conduits are separate and separately supply filtrate to the separate filtrate outlets associated with the control valve.

It will be appreciated that the filtrate accumulating in each cell can leave the same only as a corresponding quantity of gas is able to enter the respective cell for displacing the filtrate. The gas, however, must pass through the filter cake at the exterior of the drum surface in requisite quantity to replace the filtrate which leaves the cell through the conduits. For this reason the speed of cell evacuation depends upon the permeability of the filter cake. Because the time period necessary for complete cell evacuation in the case of gas impermeable or poorly gas permeable filter cakes is too long to be practicable, the evacuation of filtrate from the cells is sped up in known manner by admitting a burst of gas into the respective cells, with the gas preferably being so guided that it will flow in the same direction as the filtrate which is being evacuated. While the initial filtrate preferably is evacuated from the respective cells as the same emerge from the liquid bath via the respectively trailing conduits, it is preferred that the gas bursts be permitted to escape from the respective cells through the leading conduits.

In addition to their function of evacuating the cells of initial filtrate prior to the intrusion of wash filtrate, the gas bursts are also used for evacuating the cells before the filter cake is removed. This is true particularly if in the filter cake removal zone the removal is assisted by blowback of gas and if a moistening of the filter cake is to be avoided. In this case it is advantageous if the trailing conduit of each cell is used for admitting the respective gas burst.

In accordance with what is known from the prior art the control of the leading and trailing filtrate evacuation conduits is accomplished in having their outlet ends terminate in the neck of the filter drum on circles of different diameters, with the outlets of the respective leading and trailing conduits of each cell being preferably located on a radially extending line. The known control valves are provided with concentric grooves into which so-called bridges or stops are inserted for subdividing the individual zones. However, this construction has the disadvantage that the position of the bridges is fixed and can be changed only by disassembling the control valve with concomitant prolonged downtime for the filter structure. This downtime is particularly long if the operational conditions for the filter are in the range of higher or particularly low temperatures and if the filter prior to work on the control valve must first be brought to room temperature.

Attempts have been made to overcome this problem, for instance as disclosed in German Gebrauchsmuster 1,988,626, by providing for the shifting of the bridge members from the exterior of the control valve via a toothed segment and control rods. However, this construction is incapable of guaranteeing a complete evacuation of wash filtrate from the respective cells.

A further disadvantage of the known filters of the type under discussion, and of their associated control valves, is to be found in the filtrate removal from the control valves. In order to obtain complete evacuation of the cells and filtrate-removing conduits the filtrate in the washing zone within the control valve must be withdrawn immediately above the bridge members which delimit the washing zone. The outlet conduit necessary for evacuation of the filtrate is provided at this location. However, if as is conventional the outlet conduit is stationary for the wash filtrate, the bridge can be adjusted only within a narrow range because if the bridge member were to be moved through larger distances, for instance into the wash zone, the outlet conduit must be covered. If, on the other hand, the bridge member is moved into the initial filtrate zone, then it travels into the region below the outlet conduit and there forms a filtrate recess in which filtrate can accumulate. Similar difficulties exist in the cell evacuation between the washing zone and the drying zone.

SUMMARY OF THE INVENTION

It is, accordingly, an object of the present invention to overcome the aforementioned disadvantages.

A more particular object of the present invention is to provide, in a filter structure of the type under discussion, a control valve which provides in the washing zone a precise separation between the initial filtrate and the wash filtrate, and which guarantees at the end of the wash zone in the region of the cell evacuation by gas bursts a complete cell evacuation from all liquids.

In pursuance of the above objects and others which will become apparent hereafter, one feature of the invention resides in a filter structure which comprises a rotatable filter drum having a plurality of internal filter cells which orbit about the axis of rotation of the drum in an endless path in which they are alternately immersed in and emerge from a bath of liquid to be filtered. Suction means communicates with these cells for drawing liquid in form of the initial filtrate into the same when the respective cells are immersed, with concomitant buildup of a filter cake on the exterior of the drum in the area of the respective cells. Dispensing means for dispensing a wash solution onto the cells is also provided, while the cells are emerged from the bath so that such wash solution penetrates the filter cake and enters into the respective cells as a wash filtrate. A leading and a trailing conduit communicate with each of the cells in the respective leading and trailing region thereof for evacuating the initial filtrate and the wash filtrate. Control valve means defines two concentric annular interior channels one of which communicates with the leading conduits and the other of which communicates with the trailing conduits. First and second outlet means communicates with both of these channels and adjustable control means in the annular channels is operative for diverting initial filtrate into the first outlet means and wash filtrate into the second outlet means to thereby effect separation of the initial filtrate and the wash filtrate from one another.

By resorting to the present invention as just briefly outlined, the control valve can accommodate itself rapidly and reliably to changing operating conditions, and no need exists for the control valve to be disassembled with concomitant filter downtime. Furthermore, fluctuations with respect to the permeability of the filter cake and the shifting of the separation point between initial filtrate and wash filtrate which is dependent upon such fluctuations, no longer present a problem in a construction according to the present invention.

When the cells emerge from the bath, the smaller amount of residual filtrate normally is evacuated only through the trailing conduits. For this reason these conduits are larger dimensioned than the leading conduits. In order to make the control valve including the drum neck as small as possible in diameter, the invention provides for connecting the trailing filtrate conduits in the control valve with the outer one of the channels because of the larger available space. This has the further advantage that during blow-back via the trailing conduits a larger cross section is available so that the cells can be filled with gas more rapidly.

The novel features which are considered as characteristic for the invention are set forth in particular in the appended claims. The invention itself, however, both as to its construction and its method of operation, together with additional advantages and objects thereof, will be best understood from the following description of specific embodiments when read in connection with the accompanying drawing.

DESCRIPTION OF THE PREFERRED EMBODIMENTS

Figure 1:
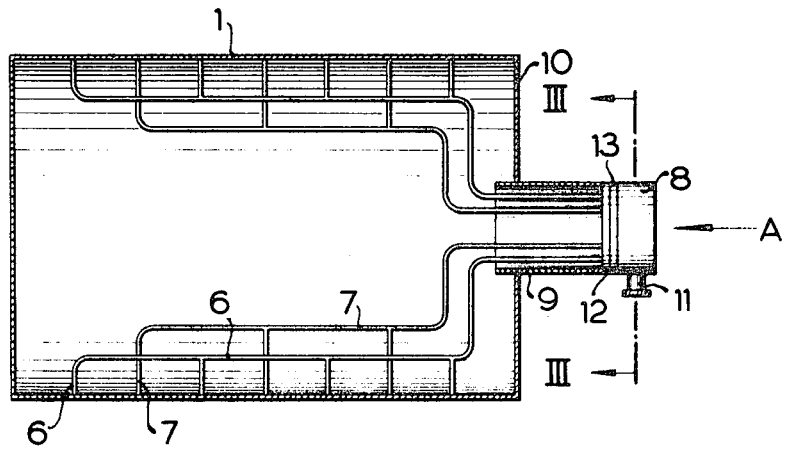
FIG. 1 is a diagrammatic longitudinal section through a filter structure of the type with which the present invention is concerned.
Figure 2:
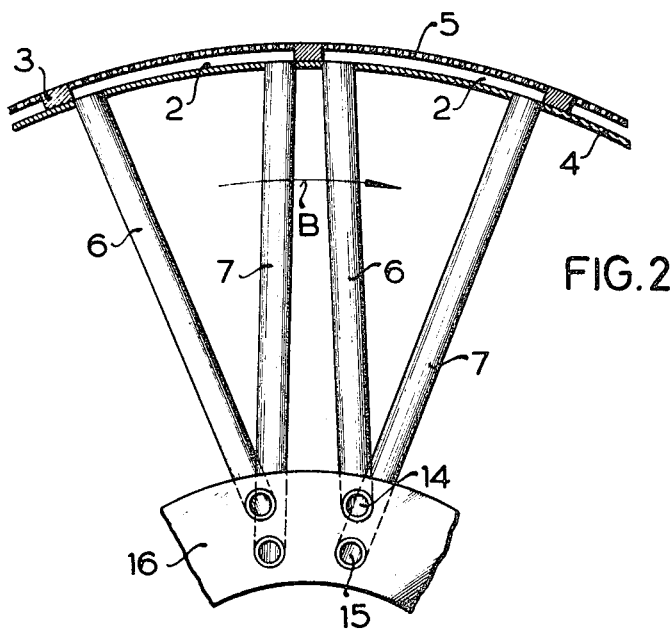
FIG. 2 is a fragmentary section, on an enlarged scale, through a filter structure such as shown in FIG. 1, illustrating details concerning the filter cells or compartments and their associated leading and trailing conduits.

Discussing the drawing in detail, and firstly FIGS. 1 and 2 thereof, it is emphasized that these Figures illustrate a cell-type or compartment-type filter structure, that is a filter structure of the type to which the present invention is directed. It will be seen that it is in form of a filter drum 1 provided on its circumference with a plurality of filter cells 2 (see FIG. 2) which are defined by the drum shell 4 and the inserts 5. These cells 2 of course extend all the way around the circumference of the drum 1. They are subdivided from one another by the walls 3. Each cell 2 communicates with a control valve 8 which is arranged in the drum neck 9 via two filtrate-collecting conduits 6 and 7, with the conduits 6 being the trailing conduits and the conduits 7 being the leading conduits, the direction of rotation of the drum 1 being indicated by the arrow B in FIG. 2. The nick of the drum is secured to the end wall 10 of the drum 1. A nipple 11 of the valve 8 is connected to a nonillustrated source of underpressure, and an end disk 12 and a control disk 13 are arranged between the valve 8 and the neck 9 with the end disk 12 being connected with the neck 9 and the control disk 13 being connnected with the valve 8. The disks 12 and 13 are provided with registering bores, which further register with bores 14 and 15 in a disk 16 of the neck 9. The bores 14 and 15 have firmly connected therein, as by welding, the end portions of the filtrate-collecting conduits 6 and 7, respectively.

The filter structure illustrated in FIGS. 1 and 2 operates in the manner discussed earlier.

Figure 3:
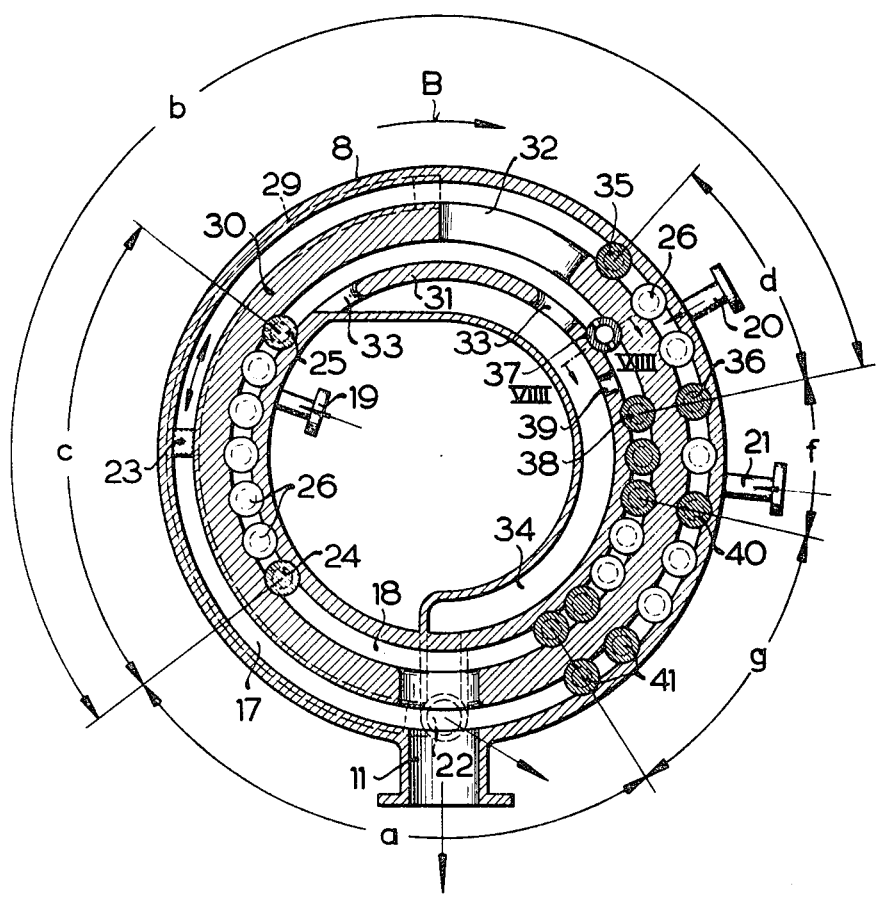
FIG. 3 is a section on the line A–B of FIG. 1.

In FIG. 3 there is shown a control valve according to the present invention, in one embodiment. According to the invention this control valve is provided with the two ring-shaped or annular channels 17 and 18 which are arranged coaxially with reference to one another an which are exactly aligned with the rows of bores 14 and 15 with which the conduits 6 and 7 are associated. The control valve is subdivided into a plurality of different zones, namely a suction zone $a$, a washing zone $b$ with a cell evacuation zone $c$ and a cell evacuation zone $d$, air or gas blowback being provided for the cell evacuation zone $c$ at the beginning of the washing zone $d$, via the conduits 7, and a similar blowback being provided in the terminal region $d$ of the washing zone via the conduits 6. Blowback in the zone $c$ takes place via an air connecting nipple 19 and blowback in the zone $d$ via a connecting nipple 20.

A blowoff zone $f$ and a neutral zone $g$ follow the washing zone $d$. A nipple 21 is arranged within the zone $f$ for supplying the blowoff gas. The drying zone is not illustrated to avoid confusion; instead, in the illustrated embodiment it is combined with the washing zone. Wash filtrate is removed through a nipple 22 which is also connected as is the nipple 11 to the nonillustrated source of underpressure. A bridge member 23 is arranged in the channel 17 and shiftable from the exterior of the valve 8; it serves to provide precise separation of the initial filtrate and the washing filtrate.

The filter cake begins to form in the region of the zone $a$, that is when the operation of the filter structure according to the invention is controlled by the region $a$ of the control valve 8. As the filter cake develops, the initial filtrate is withdrawn both through the channel 17 and through the channel 18 in order to assure a uniform development of the filter cake and to be able to remove the large quantity of filtrate quickly. When the filter cells emerge from the liquid bath, the initial filtrate is withdrawn only through the trailing conduits 6 because at this time only a smaller quantity of initial filtrate enters and is present in the cells 2, which collects in the region of the lowest or trailing cell regions, that is those which have just emerged from the bath and with which the conduits 6 communicate. In the embodiment shown in FIG. 3 the channel 18 is closed from the beginning of the washing zone $b$ with respect to the outlet nipple 11 by a stationary bridge member 24. A further stationary member 25 is arranged at a certain distance from the bridge member 24 and serves to delimit the blowback zone or cell evacuation zone $c$. Additional bores 26 are provided intermediate the bridge members 24 and 25, being closed at the exterior of the valve 8, and these serve to accommodate either the bridge members 24 or 25 in order to permit variation of the size of the zone $c$. In this zone a gas is supplied via the nipple 19 which is used for facilitating the rapid evacuation of the cells 2 and which passes through the conduits 7, cells 2 and conduits 6. In other words, the gas thus supplied traverses the same path as the initial filtrate and serves to blow the initial filtrate out of the cells 2.

Figure 5:
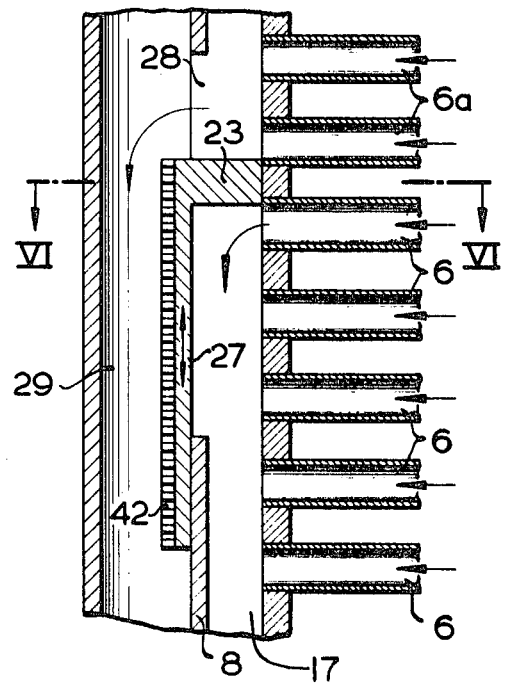
FIG. 5 is a section on the line C–D of FIG. 4.

As the cells which have emerged from the bath of liquid to be filtered move upwardly during continued rotation of the drum 1, they move into the region in which wash solution is sprayed onto the exterior of the drum 1, that is onto the filter cake which has formed at the exterior of the drum. Because the filter cake is not readily permeable to the wash solution, the latter will penetrate the filter cake and enter into the cells 2 only after a certain time has elapsed. Because of this delay the wash solution, which enters the cells 2 as the wash filtrate, passes into the trailing conduits 6. It is for this reason that a bridge member 23 is arranged at a certain distance from the beginning of the wash zone $b$ in the valve 8. The wash solution penetrates with greater or lesser speed through the filter cake depending upon the consistency of the same, and because this speed of penetration cannot be precisely predetermined, the present invention provides for adjustment of the position of the bridge member 23 from the exterior. In addition, the bridge member 23 is provided with an overflow weir 27. The initial filtrate emerging from the conduits 6 below the bridge member 23 is withdrawn via the channel 17 and the nipple 11. The wash filtrate, which arrives above the bridge member 23, is withdrawn from the conduits 6a, as shown in FIG. 5, and supplied to an outlet channel 29 via an opening 28 in the valve 8. In the illustrated embodiment of the outlet channel 29 is so arranged that it is coextensive with the channel 17 and is in communication on the one hand with the outlet nipple 22 and again via an opening in the valve 8 indirectly once again with the nipple 22. For this purpose the wall 30 which separates the channels 17 and 18, and the inner wall 31, are provided with openings 32 and 33 through which the wash filtrate from the outlet channel 29 is withdrawn along an interior channel 34 to the nipple 22. The outlet channel 29 is shown in broken lines in FIG. 3 for orientation. Because the wash filtrate runs off towards the left as well as towards the right-hand side when the filter cells are in horizontal position, that is when they reach the apex of their movement during rotation of the drum, wash filtrate enters into both the leading and trailing conduits 6 and 7, and for this reason the wash filtrate is withdrawn through the channel 17 as well as through the channel 18 in the middle of zone $b$.

Before the filter cake is blown off, each cell 2 must be completely emptied of liquid. For this reason the cell evacuation zone $d$ is provided with a further blowback via the trailing filtrate conduits 6. To achieve this, the outer channel 17 is closed by the stationary bridge members 35 and 36 in the zone $d$. Here, again, additional bores 26 are provided to permit variations in the size of the zone $d$. In the region of the zone $d$ a stationary bridge member 38 and a bridge member 37 are provided within the channel 18, with the latter having pass-through openings 52. The purpose of the bridge member 37 is to permit quick introduction of gas into the cells 2 and the conduits 6 and 7. However, when the bridge member 37 is in the position illustrated in FIG. 3, then the gas supplied by the nipple 20 can pass both through the opening 33 and through an additional opening 39, whereby a rapid evacuation of liquid from the cells 2 is achieved before the blowoff zone $f$ is reached.

In the blowoff zone $f$ all bores in the channel 18 are closed in order to prevent the residual filtrate which has accumulated in the leading conduits 7 from being blown back into the now dry filter cake. In this zone the respective trailing conduit 6 is in such a position that no residual filtrate can accumulate in it. Accordingly, the blowingoff of the filter cake takes place via the trailing conduit 6, and the bridge members 36 and 40 delimit the blowoff zone $f$ within the channel 17 if only the filter cake corresponding to the width of a single cell 2 is to be removed. It is possible, for instance, to shift the bridge member 40 within the neutral zone $g$ in order to permit simultaneous drawingoff of the filter cake over the width of two or several circumferentially adjacent cells. The bridge members 41 make it possible to select the portion of the drum shell at which the development of the filter cake begins, which is particularly advantageous if the liquid to be filtered is of a type which because of the distribution of the solids makes the development of a good filter cake possible only in the region of a steering device for the liquid.

Figure 4:
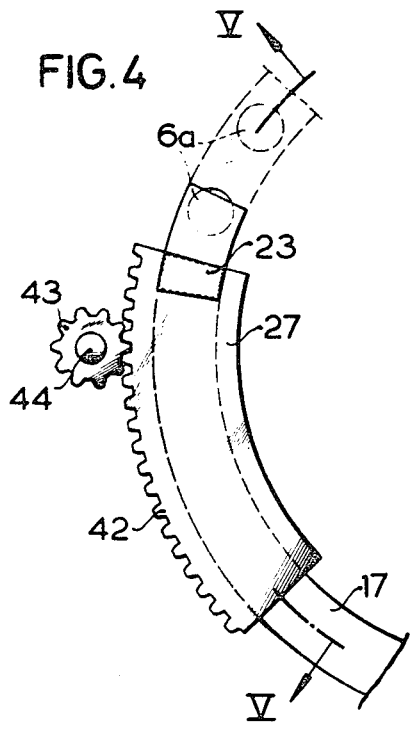
FIG. 4 is a fragmentary view in the direction of the arrow A in FIG. 1 with the cover of the control valve shown there removed for clarity of illustration.

FIGS. 4 and 5 show the adjustment of the bridge member 23. It will be seen that to permit such adjustment the overflow weir 27 of the bridge member 23 is provided with teeth so as to constitute on one side a rack 42, and that these teeth mesh with a gear wheel 43 whose shaft 44 extends outwardly of the valve 8 through the channel 29, so that by rotation of the shaft 44 the bridge member 23 can be shifted from the exterior.

Each cell 2 of the filter structure according to the present invention is connected via two conduits with the control valve. These conduits are identified with reference numeral 7 (the leading conduit) and 6 (the trailing conduit). The filter structure is separated or subdivided into several filter zones which are shown in FIG. 3 as the suction zone $a$, the wash zone $b$, the cell evacuation zone $c$ and the final wash zone $d$. In these zones different fluids communicate with the conduits 6 and 7. Thus, in the wash zone $a$ both conduits 6 and 7 receive original filtrate or initial filtrate from the exterior of the filter structure and are, for this purpose, connected via the control valve with a source of vacuum or suction. When the filter structure enters into the bath of liquid to be filtered, the prevailing underpressure draws the suspension against the outer surface of the drum with the particulate material of the suspension adhering thereto and forming the filter cake, while the liquid component is drawn through the drum as the initial filtrate and flows out through both conduits 6 and 7 and the outlet 11. The thus evacuated zone $c$ is located at the beginning of the wash zone $b$ and formed in the channel 18 by the delimiting elements 24 and 25. The nipple 19 is connected with a source of air under pressure. As soon as the tubes or conduits filled with the initial filtrate move into the region of the zone $c$ of the annular channel 18, the initial filtrate is blown out in opposite direction by the compressed air through the conduit 6 and the outlet 11. This empties conduits 6 and 7 including the cell 2, and readies them for washing. The wash filtrate cannot enter into the annular channel 18 in the region of the zone $c$. Because in the region of the annular channel 17, however, an evacuation zone cannot be provided, a different solution had to be found for providing a precise separation of the initial filtrate from the wash filtrate.

This solution is afforded by providing the control element 23 which, as shown in FIG. 3, affords a separation of the initial filtrate (below element 23) and the wash filtrate (above element 23) in the region of the zone $c$. In order to make it possible in this region to separately withdraw initial filtrate and wash filtrate, the additional annular channel 29 is provided which communicates with the channel 17 via opening 28. FIG. 5 shows that the conduits 6 receive initial filtrate and the conduits 6a receive wash filtrate in accordance with the arrows shown in FIG. 5. Element 23 alone does not, however, guarantee proper separation of the initial filtrate and the wash filtrate. There is therefore provided the overflow weir 21 in form of a cover-plate shaped portion which is connected with the element which can be arranged in the channel 17 where necessary, depending upon the permeablity characteristic of the filter cake which forms. The initial filtrate flowing out of the conduits can now leave via the annular channel 17 and the outlet 11, whereas the wash filtrate is diverted into the annular channel 29 and from there leaves through the outlet 22.

Figure 6:
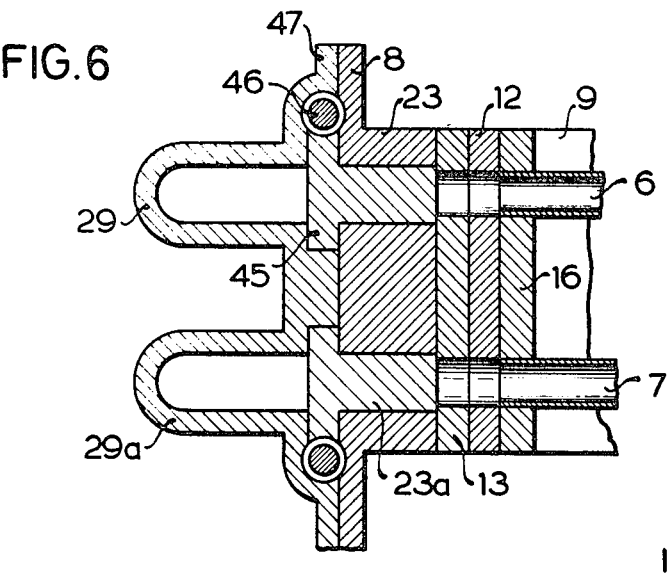
FIG. 6 is a section on the line E–F of FIG. 5 but illustrating a further embodiment of the invention.

A further embodiment for the construction of the bridge member 23 is illustrated in FIG. 6 Here, the bridge member 23 is provided with a plate 45 which at the same time constitutes the overflow weir 27. At its upper end the plate member 45 is of worm-screw-shaped configuration and connected with a worm 46 which is partially arranged in the valve 8 and the flange 47 of the channel 29, with the flange 47 serving at the same time as the end cover of the valve 8. If a bridge member 23 is used within the channel 18 in place of the bridge members 24 and 25, then the entire valve is constructed in accordance with FIG. 6, that is it receives an additional bridge member 23a and an additional outlet channel 29a.

Figure 7:
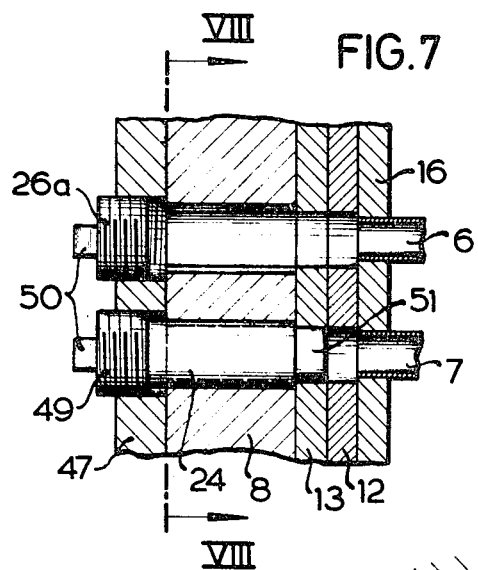
FIG. 7 is a partial section through a control valve according to the invention.
Figure 8:
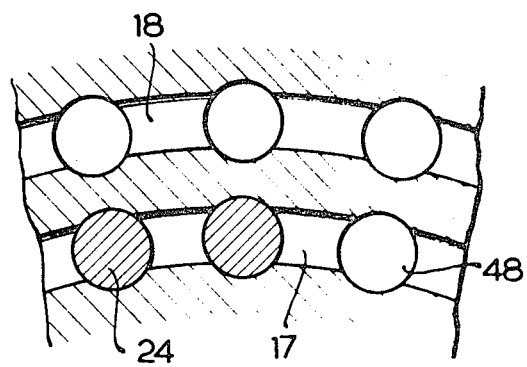
FIG. 8 is a section taken on the line G–H of FIG. 7.
Figure 9:
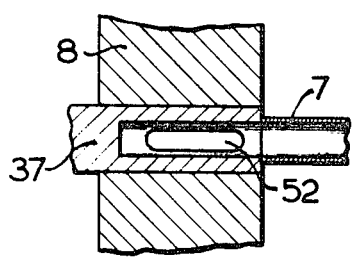
FIG. 9 is a section taken on the line J–K of FIG. 3.

In FIGS. 7 and 8 the bridge member 24 is illustrated as a circular body having a diameter which is larger than the width of the channel 17 or 18. The channels 17 and 18 are provided with bores into which the bridge member 24 are tightly sealingly inserted in order to obtain a reliably tight seal between the individual zones. At one end the bridge members 24 are provided with screw threads 49 and a portion 50 of polygonal configuration to facilitate their threading into the bores. At the lower end the screw threaded portions 49 are provided with projections 51 which extend into the bores of the control disk 13 with the ends of the projections 51 being located precisely in the plane of the outer surface of the control disk 13. FIG. 7 additionally shows the caps 26a which are also provided with a polygonal portion for facilitating their threading into a tapped bore of the flange 47.

Figure 10:
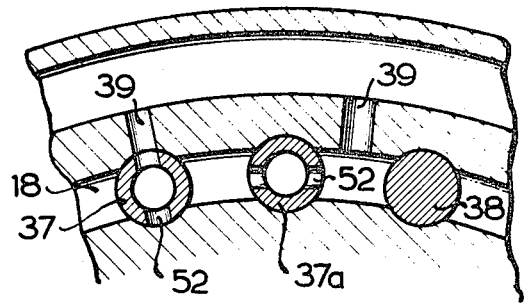
FIG. 10 is a side view of FIG. 9.

FIG. 10, finally, shows two possibilities of use of bridge members 37 in conjunction with the openings 52. The bridge member 37 shown at the left-hand side of FIG. 10 is used as a separator whereas the bridge member 37a located at the right-hand side serves to establish and uncover a flow-through opening to permit flowing from one zone into the other. The additional bores 39 provide further variation possibilities for withdrawing the wash filtrate and the gas for the blowback.

It will be appreciated that the present invention as illustrated may be varied without departing from the concept according to the invention. It is possible, for instance, to arrange adjustable bridge members 23 in both the channels 17 and 18 in the region of the zone c. Again, in both channels bridge members 24 or 25 could be provided. Furthermore, bridge members 23 or, as shown in the illustrated embodiment in the zone c, either an adjustable bridge member or stationary bridge members can be provided in the zones d and f also. The important consideration is always that a complete evacuation of the cells 2 is guaranteed both in the zone c and in the zone d, and that a precise separation between initial filtrate and wash filtrate is possible in the zone c. The zone c within the channel 18 requires only a single adjustment or setting, because it is possible to determine in advance what the extent must be of the blowback zone. However, this is not always possible in the channel 17 in the region of the zone c, that is it is not always possible to determine in advance the position required of the bridge member 23, because the relationship between withdrawal of initial filtrate, the inflow of wash filtrate and the composition of solids make necessary a constant accommodation to the respective operation conditions so that the bridge member 23 must be frequently shifted and adjusted.

It will be understood that each of the elements described above, or two or more together, may also find a useful application in other types of applications differing from the types described above.

While the invention has been illustrated and described as embodied in a filter structure, it is not intended to be limited to the details shown, since various modifications and structural changes may be made without departing in any way from the spirit of the present invention.

We claim:

1. A filter structure, comprising a rotatable filter drum having a plurality of internal filter cells which orbit about the axis of rotation of said drum in an endless path in which they are alternately immersed into and emerge from a bath of liquid to be filtered; suction means communicating with said cells for drawing liquid in form of the initial filtrate into the same when the respective cells are immersed, with concomitant buildup of a filter cake on the exterior of said drum in the area of the respective cells; dispensing means for dispensing a wash solution onto said cells while the same are emerged from said bath, so that such wash solution penetrates the filter cake and enters into the respective cells as a wash filtrate; a leading and a trailing conduit communicating with each of said cells in the respective leading and trailing region thereof for evacuating said initial filtrate and wash filtrate; and control valve means defining two concentric annular interior channels a first of which communicates with said leading conduits and a second of which communicates with said trailing conduits a third channel communicating with one of said first and second annular channels via opening means first and second outlet means communicating with said channels, and adjustable control means in said first and second annular channels and including a control member located in said one channel displaceable along the same from the exterior of said valve means and comprising a portion extending through said opening means into said third channel, said control member including said portion being operative, depending upon their location with respect to said one channel and said third channel, for diverting initial filtrate via said one channel into said first outlet means and wash filtrate via said third channel into said second outlet means to thereby effect separation of said initial filtrate and wash filtrate from one another.

2. A filter structure as defined in claim 1, wherein the inner of said annular channels communicates with said leading conduits, and the outer of said annular channels communicates with said trailing conduits.

3. A filter structure as defined in claim 1, said second outlet means comprising an outlet conduit and a plurality of apertures provided at circumferentially spaced locations of said channels and communicating with said outlet conduit; and wherein said control means comprises bridge members adjustable for closing selected ones of said apertures.

4. A filter structure as defined in claim 1, said outlet means comprising interior ring channels provided in said control valve means rigid theretiwth.

5. A filter structure as defined in claim 1, said suction means being operative for applying suction to the respective leading and trailing conduits separately and in rotation with reference to said plurality of filter cells.

6. A filter structure as defined in claim 3, said control valve means comprising wall means surrounding and defining said concentric annular interior channels; further comprising a plurality of bores penetrating said wall means and registering with respective ones of said apertures; and wherein said bridge members are each received in one of said bores and movable therein between an advanced position in which they project into and seal the respectively registering aperture and a withdrawn position in which they are withdrawn from such aperture.

7. A filter structure as defined in claim 6, wherein said bores have a diameter greater than the width of said channels.

8. A filter structure as defined in claim 6, said wall means comprising cover means for said control valve means, and said bridge members being threadedly connected to said cover means so as to be supported thereby.

9. A filter structure as defined in claim 8, said outlet conduit being provided in and of one piece with said cover means.

10. A filter structure as defined in claim 3, said bridge members being slidably accommodated in said channels.

11. A filter structure as defined in claim 3, wherein said annular channels comprise a plurality of circumferentially adjacent zones each of which is associated with a predetermined control function of said control valve means, one of said zones being associated with evacuation of liquid from the respective cells; and wherein said second channel accommodates in said one zone thereof a slidable one of said bridge members and said first channel accommodates in said one zone thereof a pair of said bridge members which are insertable through respective bores in the wall bounding said second channel and movable at will to a position in which they extend into registering ones of said apertures for sealingly closing the same.

12. A filter structure as defined in claim 6, wherein at least one of said bridge members is provided with a valve-controlled flow-through opening.

* * * * *